(No Model.)
H. BODENSTEIN.
COOKING OR HEATING VESSEL.
No. 412,455. Patented Oct. 8, 1889.
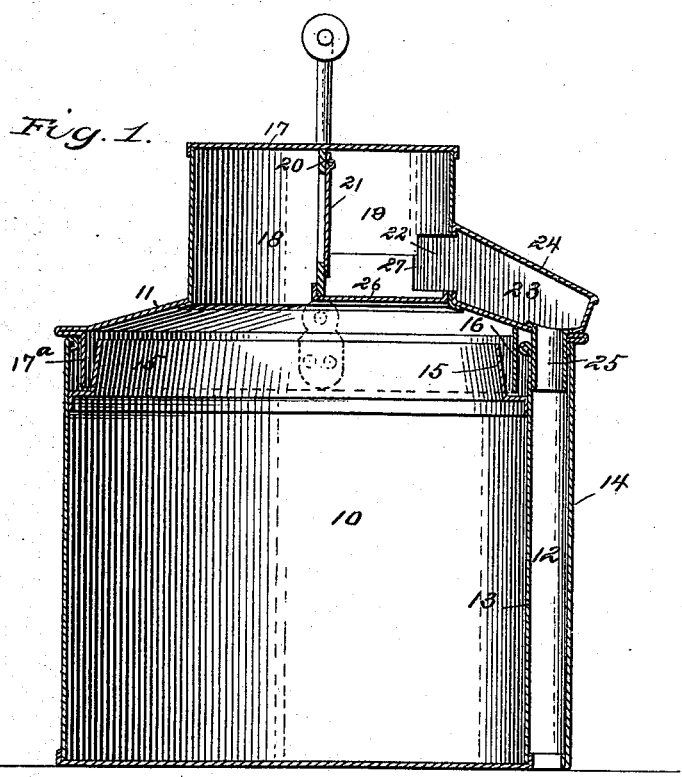
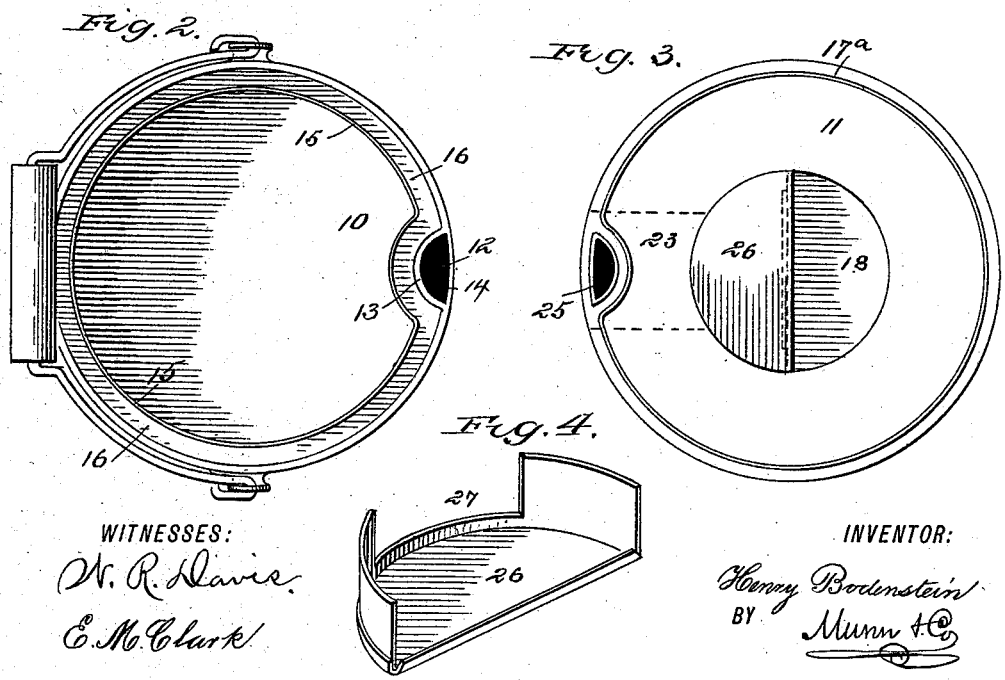
WITNESSES:
W. R. Davis
E. M. Clark
INVENTOR:
Henry Bodenstein
BY Munn & Co.
ATTORNEYS.

UNITED STATES PATENT OFFICE.

HENRY BODENSTEIN, OF STAATSBURG, NEW YORK.

COOKING OR HEATING VESSEL.

SPECIFICATION forming part of Letters Patent No. 412,455, dated October 8, 1889.

Application filed June 25, 1889. Serial No. 315,471. (No model.)

*To all whom it may concern:*

Be it known that I, HENRY BODENSTEIN, of Staatsburg, in the county of Dutchess and State of New York, have invented a new and useful Improvement in Cooking and Heating Vessels, of which the following is a full, clear, and exact description.

My invention relates to an improvement in cooking and heating vessels, such as pots, stew-pans, wash-boilers and other vessels of like character provided with a lid or cover.

The object of the invention is to provide a simple means whereby the odors from any article being cooked, boiled, or heated will be effectually prevented from passing off into the room, and likewise the steam should any be generated.

The invention consists in the novel construction and combination of the several parts, as will be hereinafter fully set forth, and pointed out in the claims.

Reference is to be had to the accompanying drawings, forming a part of this specification, in which similar figures of reference indicate corresponding parts in all the views.

Figure 1 is a central vertical section through a cooking-vessel having my improvement applied. Fig. 2 is a plan view of the vessel with the cover removed. Fig. 3 is a bottom plan view of the cover, and Fig. 4 is a perspective view of a detachable bottom piece adapted for use in connection with the cover-dome.

The body 10 of the vessel, which may be made in any desired shape and of any suitable material, is usually circular or oval, comprising perpendicular or flaring sides and a bottom, the top being covered by a detachable lid or cover 11. Upon the inner face of the side of the body a fume and steam passage 12 is formed, extending from the top downward to the bottom and through the latter, as shown in Fig. 1. This passage is usually made by securing a semicircular piece of metal to the side of the body and opening the bottom in front of the strip, or by curving the side inward, as shown at 13 in Fig. 2, and securing a strip of metal 14 to the outer face of the body, extending across the cavity flush with the periphery. Upon the inner face of the body, near the top, an annular flange 15 is secured, which extends horizontally from the sides and at an inclination upward and inward, as best shown in Fig. 1, forming a chamber 16.

The cover 11 is provided with a dome 17, preferably centrally located, and an annular flange 17$^a$, adapted to enter and fit comparatively loosely in the body-chamber 16. The dome 17 is divided into two compartments 18 and 19 by a partition 20, having an opening therein normally closed by a gate or valve 21, hinged at its upper end near the top of the partition within the compartment 19. In the side wall of the compartment 19 of the dome, opposite the valve 21, an opening 22 is produced, leading into a channel 23, formed by securing a jacket 24, having a closed top, sides, and outer end to the upper face of the cover, as shown in Fig. 1, the inner open end of the said jacket being attached with a steam-tight joint to the dome around the opening 22.

Near the periphery of the lid a tube 25 is projected upward from the under side within the channel 23, of a contour and size to readily enter the upper end of the body-passage 12. The tube 25 usually extends downward flush with or slightly beyond the lower edge of the cover-flange, the said flange being inwardly curved to provide a space between it and the opposed face of the tube, as shown in Fig. 3. The body-flange 15 is also curved to form a space between it and the opposed wall of the passage 12, equal in width to the space intervening the said flange and contiguous side face of the body, as shown in Fig. 2.

The compartment 19 of the cover-dome is closed at the bottom by a detachable flanged plate or cap 26, having a recess 27 in that portion of the flange facing the dome-opening 22 when the cap is in position, whereby the said opening is unobstructed. (See Figs. 1 and 4.)

In operation the articles to be cooked, heated, or boiled, together with a suitable quantity of water, are introduced into the body of the vessel, and the cover is placed in position, the flange of the cover entering the body-chamber 16 and the tube 25 in the passage 12. The vessel is then placed directly over the fire, or so that the lower end of the passage 12 will be over the fire. As the steam is generated, in its attempt to pass out between the bottom of the chamber 16 and the cover-flange condensation takes place and a steam-tight water seal is immediately effected at this point. When this seal is obtained, which may be effected by placing water in the chamber 16, the odors and steam are compelled to pass out through the valved opening in the dome-partition into the compartment 19 through the channel 23, and down the passage 12 into the fire. Any products of combustion passing up the passage 12 are prevented from gaining access to the interior of the body by the valve 21, which opens one way only, and by removing the cap 26 the compartment 19 and passage 23 may be cleaned at any time of soot or ashes.

I do not confine myself to any particular number of fume and steam passages 12, and the body-flange may be placed upon the outside, if found desirable. The body may also be made without a bottom, and, together with the cover, be used as a jacket for vessels to which the improvements cannot be conveniently attached, or that are without them.

If in practice it is found desirable, the bottom of the body of the device may be provided with an integral flange, whereby, should not the passage 12 come immediately over the fire-hole of the stove, the steam and odors may pass beneath the bottom of the fire-hole.

Having thus described my invention, what I claim as new, and desire to secure by Letters Patent, is—

1. The combination, with the body of a vessel provided with a peripheral passage extending from top to bottom, of a cover provided with a dome having open and closed compartments, an inclosed angled channel formed upon the cover, connecting with the closed dome-compartment and capable of connection also with the body-passage, and a valve-connection between the compartments of the dome, substantially as shown and described.

2. The combination, with the body of a vessel provided with a peripheral passage extending from top to bottom, and an interior sealing-chamber, of a flanged top or cover provided with a dome having open and closed compartments, an inclosed channel formed upon the cover, communicating with the closed dome-chamber and the body-passage, and a valve-connection between the compartments of the dome, substantially as described.

3. The combination, with the body of a vessel provided with a peripheral vertical passage extending from top to bottom, and an interior trough or sealing-chamber near the top, of a cover provided with a flange capable of entering the trough or sealing-chamber, and a dome having an open compartment and closed compartment provided with a detachable wall, a valve-connection between the dome-compartments, and an angled inclosed chamber formed upon the cover, connecting the closed dome-compartment and body-passage, substantially as described, and for the purpose specified.

HENRY BODENSTEIN.

Witnesses:
MILES HUGHES,
EDMUND RYER.